Nov. 24, 1936.   G. M. DEMING   2,061,795

PRESSURE REGULATOR

Filed March 15, 1933

INVENTOR
George M. Deming
BY
ATTORNEY

Patented Nov. 24, 1936

2,061,795

UNITED STATES PATENT OFFICE 2,061,795

PRESSURE REGULATOR

George M. Deming, East Orange, N. J., assignor to Air Reduction Company, Incorporated, New York, N. Y., a corporation of New York Application March 15, 1933, Serial No. 660,818

2 Claims. (Cl. 50—26)

This invention relates to pressure regulators of the kind in which a rubber diaphragm clamped at its margin and backed by a rigid diaphragm plate is interposed between the regulator spring and a reduced pressure chamber, to control, through a lever, the small movements of valve means coacting with an orifice through which gas from a region of higher pressure must pass to reach the reduced, regulated pressure chamber. More specifically, the invention relates to pressure regulators in which the diaphragm plate is free as distinguished from one that is fastened or secured to the diaphragm.

Rubber diaphragms have advantages over metal diaphragms for gas pressure regulation. The diaphragm plate is not merely a seat for the regulator spring but has an important influence on the quality of regulation that is obtained. Generally speaking, for the best regulation, the diaphragm plate should be of large diameter, though in some instances special considerations dictate the use of a small diaphragm plate.

The diaphragm plate is often clamped to the diaphragm by means of a face plate and a central screw connection. This, however, necessitates piercing the diaphragm, making possible a diaphragm leak. In regulators in which the diaphragm is left imperforate and in which the diaphragm and diaphragm plate are separate from each other, the danger of leaking through the diaphragm plate is avoided, but the plate is apt to shift on the diaphragm. Then, if the diaphragm plate is large, it will rub on the case, interfering with the action of the regulator. Furthermore, the regulator spring is carried to one side, which affects its tension and produces an off-center action in relation to the transmission element associated with the valve device.

The rubber of these diaphragms is not perfectly elastic, but has a plastic property, which during a period of operation permits the end of such transmission element to sink gradually into the diaphragm, causing the working or regulated pressure to fall off, unless the end of the element that bears against the rubber has a large area to distribute the load.

The object of this invention is to provide an improvement in pressure regulators which realizes fully the advantages of the rubber diaphragm without attendant disadvantages. Among the objects are to employ an imperforate diaphragm and thus to preclude leaks through the diaphragm, to utilize a separate and unfastened diaphragm plate and still centralize the plate and the action of the regulator spring in respect to the valve lever, and to avoid deterioration in regulation due to slow embedding of the transmission element in the rubber.

The manner in which part or all of these objects may be attained will be understood from the illustrated embodiments of the invention and their description.

In the accompanying drawing, forming part hereof:

Figure 1:
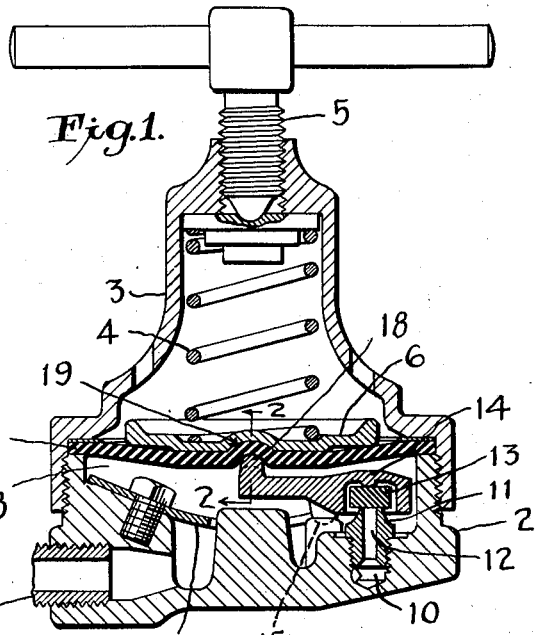
Fig. 1 is a section perpendicular to the diaphragm of one form of regulator embodying the invention.
Figure 2:
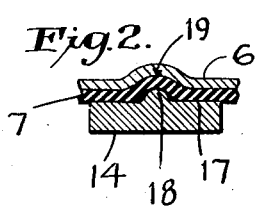
Fig. 2 is a fragmentary section taken on the line 2—2 of Fig. 1.
Figure 3:
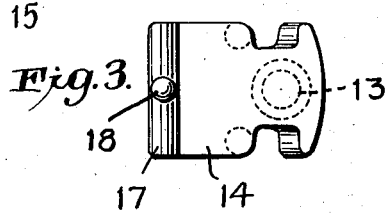
Fig. 3 is a plan view of a lever, constituting the illustrated form of a transmission portion or element between the diaphragm and the valve.

The regulator illustrated in Fig. 1 has a body 2, on which is screwed a spring case 3 containing a regulator spring 4, which can be adjusted by screw 5 to give a regulated, reduced gas pressure of any desired value within the range of the regulator. The spring exerts its pressure against a relatively large diaphragm plate 6 and through this plate against the rubber diaphragm 7 clamped circumferentially between the body and the spring case. The diaphragm plate is not united to the diaphragm, and the diaphragm forms an imperforate, yielding wall of the reduced pressure chamber 8.

An outlet or delivery connection 9 from this chamber is shown. The inlet or high pressure connection is not shown in this view, since it happens to be in front of the plane of the section, but the high pressure side or space of the regulator is represented by a cavity 10, to which the high pressure gas is freely admitted. A nozzle 11 screwed into this cavity and projecting into the reduced pressure chamber contains the orifice 12 through which the gas strives to flow from the region of higher pressure to the region of lower pressure.

Coacting with the lip of this nozzle is a valve element 13, or "seat" as it is commonly termed in the art, which in this instance is confined in a recess in a lever 14 of the first order, fulcrumed at 15, this lever constituting a connection or transmission element that bears against the diaphragm. A compensating spring 16 acts on the lever to press the valve element against the outlet of the nozzle with a force sufficient to overcome the force of the high pressure gas and shut off flow through the orifice. A regulator embodying a construction of this kind is disclosed in my Patent No. 1,839,837.

As in the said patent, the transmission lever has an arched crest 17 to bear against the under side of the rubber diaphragm and accommodate the rocking of the lever. The surface of the transmission element in contact with the diaphragm is made large enough to minimize or eliminate the falling off in the regulated gas pressure that would result from slow embedding of the transmission element in the rubber. In the illustrated embodiment of the invention, the crest 17 is made well rounded and of a length to extend at each side of the center of the diaphragm. At the center of the diaphragm the part 14 is formed so as to present a small spherical convexity 18 opposed, across the diaphragm, to a central concavity 19 in the diaphragm plate, this concavity being small in relation to the length of the crest. The effect is to centralize the diaphragm plate and regulator spring with no impairment of regulation.

Figure 4:
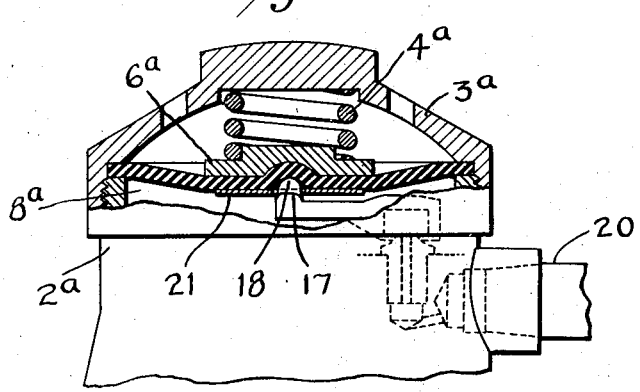
Fig. 4 is a fragmentary view, partly in section and partly in elevation, of an embodiment of the invention that may be applied to multi-stage regulators or to fixed pressure regulators.

In Fig. 4 the invention is shown as applied in a double reduction regulator such as disclosed in my Patent No. 1,948,027. What is shown is the first stage of the regulator, the chamber 8ª being the inter-stage chamber of the regulator. The regulator spring 4ª of the first stage of such a regulator need not be adjustable, which may be true also of the regulator of a single stage "fixed pressure" regulator. In a dual or double reduction regulator, the first stage does not in itself regulate the fundamental working pressure delivered from the regulator, and it has been found that the best results may be obtained if the diaphragm plate 6ª of this stage is of comparatively small diameter as shown. If this view were an illustration of a single stage, fixed (non-adjustable) regulator, as it otherwise might be, the diaphragm plate would be large as in Fig. 1. The inlet connection 20 is shown in this view.

If the diaphragm plate be large, the invention accomplishes two things, namely, it keeps the diaphragm plate from rubbing against the case, and it centers the action, the result being better regulation. If the diaphragm plate be small and the regulator spring short, the second function is served, for the same advantage.

Fig. 4 illustrates a feature of the invention applicable to single or to double stage regulators in which the pressure of a regulator spring can not be let off by a screw or other means. In the regulator of Fig. 4, when the spring case 3ª is screwed on the body 2ª, the unadjustable spring 4ª exerts such pressure during this assembly operation that the diaphragm is rotated before it becomes clamped. That would wear the rubber diaphragm against the crest 17. To prevent this injury, a distributor plate or disc 21 is interposed between the crest 17 and the rubber diaphragm, this disc having a central opening through which the centralizing protuberance 18 projects.

I claim:

1. In a pressure regulator of the kind described, the combination of an imperforate rubber diaphragm, a diaphragm plate which is unfastened to the diaphragm, and a valve lever having an arched crest to bear against said diaphragm and accommodate the rocking movement of the lever, said crest being rounded in one direction and elongated in the other direction and having a small spherically rounded protuberance at the center of its length, and said diaphragm plate having a central concavity which cooperates with said protuberance to centralize the diaphragm plate, said concavity being small in relation to the length of the crest which coacts in thrust through the interposed diaphragm with the face of the diaphragm plate.

2. In a pressure regulator of the kind described, a valve lever having an arched crest and a small central spherically rounded protuberance, in combination with an imperforate rubber diaphragm, the diaphragm plate having a central concavity adapted to cooperate with said protuberance to centralize the diaphragm plate, and a distributor disc interposed between the crest and the diaphragm.

GEORGE M. DEMING.